Nov. 25, 1941.   L. D. BRIDGE   2,264,110
LENS FOR AUTOMOBILE SAFETY LIGHTS
Filed Feb. 28, 1940
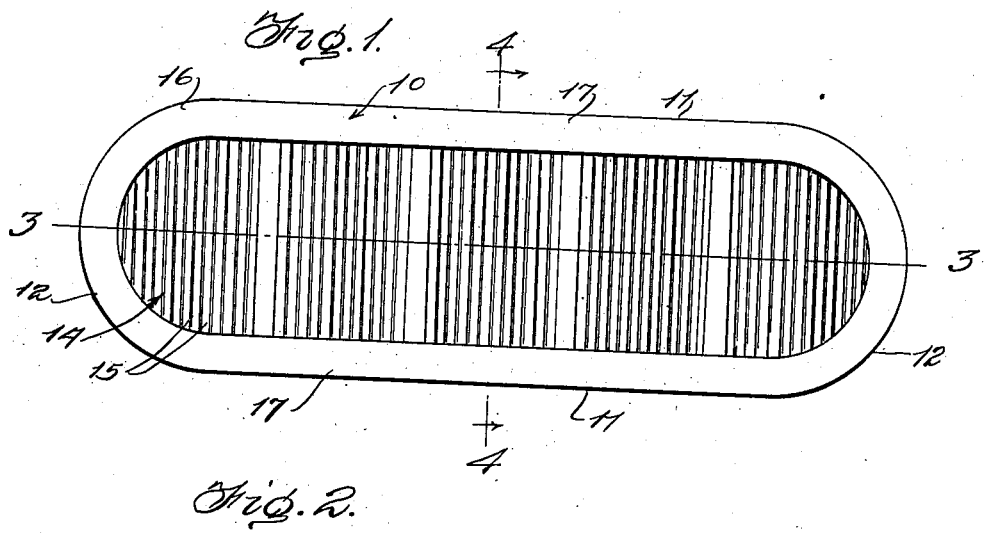
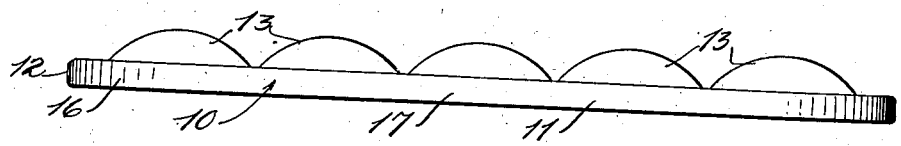
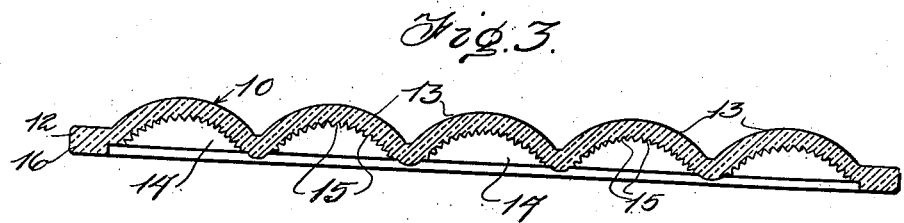
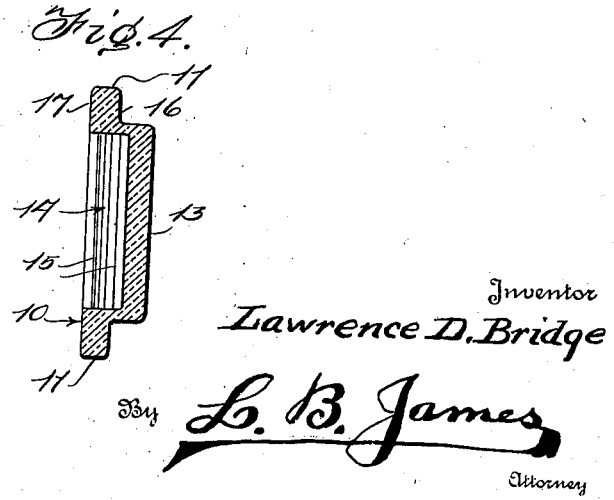
Inventor
Lawrence D. Bridge
By L. B. James
Attorney Patented Nov. 25, 1941

2,264,110

UNITED STATES PATENT OFFICE 2,264,110

LENS FOR AUTOMOBILE SAFETY LIGHTS

Lawrence D. Bridge, Blairsville, Pa., assignor to L. D. Bridge Company, Blairsville, Pa., a corporation of Pennsylvania Application February 28, 1940, Serial No. 321,348

2 Claims. (Cl. 240—106.1)

This invention relates to lenses and has special reference to an illuminating and light distributing lens.

More particularly the invention relates to a lens of this character which is peculiarly adapted for use in connection with an automobile or other vehicle and which may be used for illuminating the running board or for use in connection with any other part of the vehicle.

One important object of the invention is to provide a novel form of lens wherein an extremely wide dispersion of the light from a lamp placed behind the lens may be affected.

A second important object of the invention is to provide a novel form of lens for such purpose whereby the light field produced by the lens will be of stationary, uniform intensity throughout.

With the above and other objects in view the invention consists in general of certain novel details of the construction and combination of the parts hereinafter fully described, illustrated in the accompanying drawing, and particularly pointed out in the claims.

In the accompanying drawing, like characters of reference indicate like parts in the several views, and—

Figure 1 is an elevation of the improved lens from the inner or rear side thereof.

Figure 2 is a top plan view of the lens.

Figure 3 is a section on the line 3—3 of Figure 1.

Figure 4 is a section on the line 4—4 of Figure 1.

In the embodiment of the invention here illustrated the lens forms an elongated structure 10 which is made from some transparent and light refracting material such as glass. Preferably the lens has circular top and bottom edges 11 and semicircular end edges 12 though it may be of any outline desired so long as it presents an elongated structure. The front surface of the main portion of the lens is formed by a series of segmento-cylindrical sections 13, these sections having smooth surfaces. These sections 13 are preferably all of the same width and have the same radii of curvature so that they all project an equal distance forwardly. The axes of these cylindrical segments are vertical when the lens is in normal position of use. The rear face on the main portion of the lens is provided with a series of concavities 14 which are generally concentric to the surfaces 13 but which are formed with a multiplicity of small prismatic projecting portions 15 which preferably have equal cross sections and extend parallel to the axes of the portions 13.

Around this main portion just described there extends a rim 16 having parallel upper and lower portions 17. The prisms 15 extend between these circular portions while the convex portions 13 extend well forwardly of the rim 16, but closed at their upper and lower ends by flat portions 18.

In operation a single lamp is placed behind and close to the center of the lens, it being preferable that the lens is an uneven number of portions 13 so that such lamp may intersect, with its optical axis the axis of the center projection 13. With the lamp in this position the light rays emanating from the lamp strike the prisms 15 and are refracted thereby to spread through the thickness of the lens after which the curvature surface 13 serves to further direct the rays laterally, the rays from the several surfaces 13 intersecting each other. By this means an extremely wide dispersion of the light from the lamp is obtained so that the effective light produced is in the form of a wide beam having comparatively little vertical extension.

It is obvious that changes may be made in the form and construction of the invention without departing from the principles thereof. It is not therefore desired to confine the invention to the exact form herein shown and described, but it is wished to include all such as properly come within the scope of the appended claims.

What is claimed is:

1. An illuminating and light distributing lens including an elongated structure of transparent and light refracting material, said structure having an outer face provided with a series of transversely extending convex segmento-cylindrical abutting portions arranged side by side, said structure having an inner face provided with a multiplicity of prismatic projections arranged side by side and parallel to the axes of the segmento-cylindrical portions, said segmento-cylindrical portions having equal radii and equal arcs of curvature and the prismatic projections all having equal cross-sections, said structure having a peripheral rim including side portions between which the prismatic projections extend and having the convexities of the segmento-cylindrical portions projecting forwardly of a surface defined by the face of said rim.

2. An illuminating and light distributing lens including an elongated structure of transparent and light refracting material, said structure having an outer face provided with a series of convex segmento-cylindrical abutting portions arranged side by side with their abutting edges merged into one another, said structure having an inner face provided with a multiplicity of prismatic projections arranged side by side to points adjacent said abutting edges and parallel to the axes of the segmento-cylindrical portions, said segmento-cylindrical portions having equal radii and equal arcs of curvature and the prismatic projections all having equal cross sections, said structure having a peripheral rim including top and bottom portions between which the prismatic projections extend and the convexities of the segmento-cylindrical portions projecting forwardly of a plane defined by the face of said rim, said rim being thicker than the segmento-cylindrical portions and of uniform thickness throughout and having the rear faces of its side and end portions in a plane rearwardly of the segmento-cylindrical portions.

LAWRENCE D. BRIDGE.